United States Patent [19]

Fern et al.

[11] Patent Number: 4,498,811
[45] Date of Patent: Feb. 12, 1985

[54] UNDERWATER PIPELINE SEALING APPARATUS

[75] Inventors: Derek T. Fern, Gretna; Gary E. Harrison, Marrero, both of La.

[73] Assignee: McDermott Incorporated, New Orleans, La.

[21] Appl. No.: 349,559

[22] Filed: Feb. 17, 1982

[51] Int. Cl.³ .......................... F16L 1/04; F16L 55/10
[52] U.S. Cl. .................................... 405/168; 405/171; 405/173; 138/89
[58] Field of Search ............... 405/158, 166, 168, 171, 405/173; 138/89, 97

[56] References Cited

U.S. PATENT DOCUMENTS

| 3,788,084 | 1/1974 | Matthews | 405/173 |
| 3,842,612 | 10/1974 | Arnold | 138/89 X |
| 3,943,982 | 3/1976 | Lecordier | 138/89 |
| 3,978,678 | 9/1976 | Duncan | 405/171 |
| 4,057,081 | 11/1977 | Jones | 138/97 |
| 4,332,277 | 6/1982 | Adkins | 138/89 |

FOREIGN PATENT DOCUMENTS

| 211293 | 5/1957 | Australia | 138/89 |
| 896 | of 1899 | United Kingdom | 138/89 |

Primary Examiner—Cornelius J. Husar
Assistant Examiner—Nancy J. Stodola
Attorney, Agent, or Firm—Robert J. Edwards; James C. Simmons

[57] ABSTRACT

Apparatus for preventing flow of water from a first underwater pipeline portion forward of the apparatus to a second underwater pipeline portion rearward of the apparatus. At least one wedge-shaped member is mounted on a carriage of the apparatus for grippingly engaging the internal wall of a pipeline for preventing movement of the apparatus in a rearwardly direction upon application of force to the carriage urging the carriage in a rearwardly direction in the pipeline. In order to provide frictional contact with the pipeline wall so that gripping engagement thereof may be effected, the member is continually urged into sliding engagement with the pipeline wall during movement of the apparatus through the pipeline in a forwardly direction. The apparatus is further provided with an annular elastomeric member responsive to water pressure from forwardly of the apparatus for sealingly engaging the pipeline wall to prevent flow of water from the first underwater pipeline portion to the second underwater pipeline portion.

18 Claims, 7 Drawing Figures

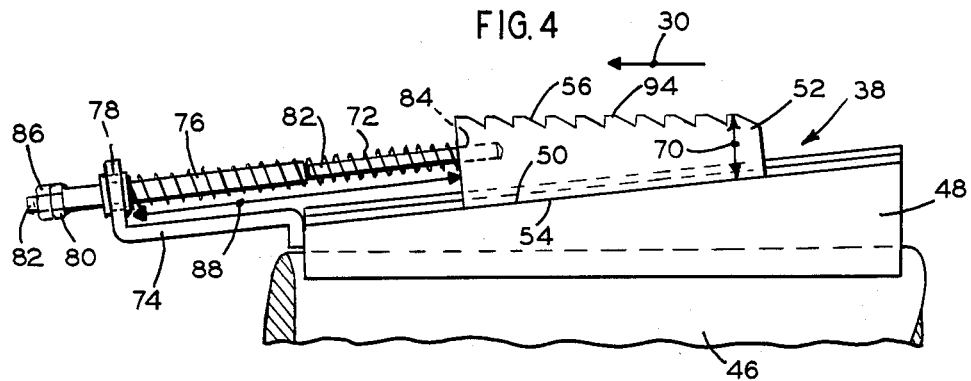
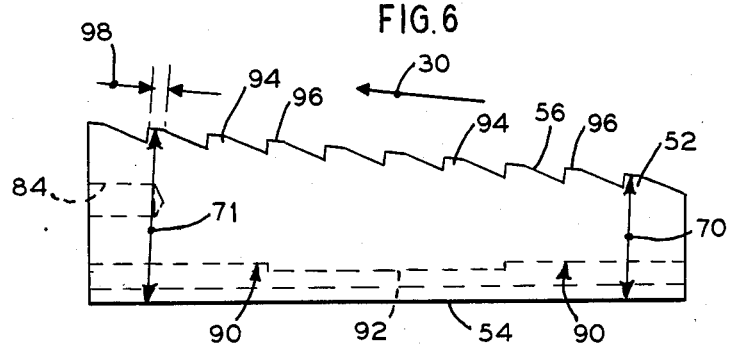
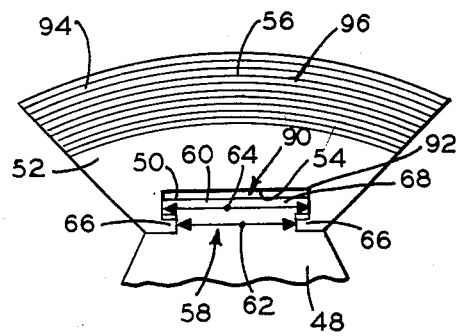
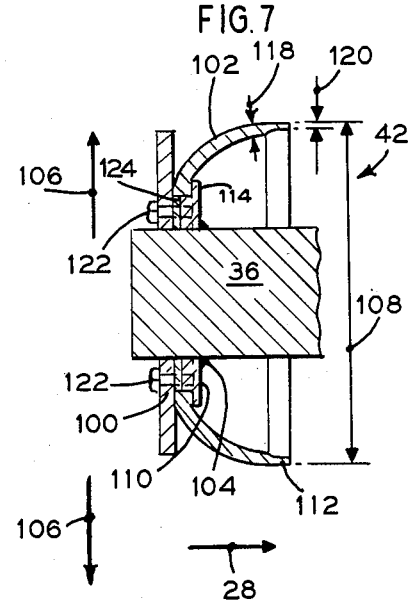

UNDERWATER PIPELINE SEALING APPARATUS

This invention relates to the laying of underwater pipeline. More particularly, this invention relates to apparatus for preventing flow of water from a first underwater pipeline portion forward of the apparatus to a second underwater pipeline portion rearward of the apparatus.

The laying of an underwater pipeline ordinarily involves connecting a plurality of pipe sections together in end-to-end relationship on a work barge and subsequently lowering the connected sections into the water in sequence as the work barge moves in the direction in which the pipeline is being laid. A catenary is thus formed between the sea bottom and the work barge. The pipeline is susceptible to buckling and breakage in the area of the catenary, particularly during rough seas. Unless the pipeline is otherwise sealed against the influx of water from a point of breakage thereof, such breakage will cause the previously laid section of pipeline on the sea bottom to become flooded with water. Once this occurs, the pipeline must be dewatered before the end thereof is raised to the surface for repairs so that pipeline laying operations can continue.

A dewatering operation is time consuming and expensive because it requires that a pipeline pigging device be run through the entire line from the shore station or platform to the point at which the damage exists. This may necessitate pigging of the line over a distance of several miles and may require the use of high pressure compressors for extended periods of time. In addition, it may be difficult to provide compressors with the required capacity and pressure ratings at the necessary location, particularly if the pipeline is one which extends from an offshore platform or similar installation.

Efforts have been made to provide apparatus for use in pipe laying operations which prevents the flow of water into and thus obviates the need for dewatering the previously laid section of pipeline on the sea bottom if breakage in a pipeline should occur. Such an apparatus will typically be disposed in a pipeline at the sea bottom to be towed through the pipeline as the pipeline is laid so that it is continually adjacent to and rearwardly of the catenary portion to seal the pipeline against the influx of water into the remainder of the pipeline if breakage in the catenary region were to occur.

Since such an apparatus is carried within a pipeline as a form of insurance against the eventuality that a rupture of the pipeline will occur and should therefore be continuously in condition to actuate to seal the pipeline, it is highly desirable that such an apparatus be reliable. However, various such devices of the prior art use elaborate and expensive means such as sensor valves, compressed air equipment, electrical circuitry, and piston-cylinder arrangements for actuation thereof. Since such means, due to their complexity, may occasionally fail for various reasons which are readily apparent, it is not unlikely that a device using such actuation means will fail at the very moment it is needed to seal a pipeline. Other such devices with retractible arms for gripping a pipeline wall may become ineffective by the arms pivoting in a direction lengthwise of a pipeline past the point where they would otherwise grip a pipeline wall thus extending in a rearwardly direction of the device. Such pivoting may occur, for instance, if this type of device is not properly centered in a pipeline.

It is an object of the present invention to provide such an apparatus which is more reliable.

It is a further object of the present invention to provide such an apparatus which is inexpensive and substantially maintenance-free yet is more reliable such that there is little or no cause for concern as to whether or not it will function when there is a pipeline rupture.

It is a still further object of the present invention to provide such an apparatus which more effectively seals a pipeline.

The above and other objects, features, and advantages of this invention will be apparent in the following detailed description of the preferred embodiments thereof which is to be read in connection with the accompanying drawings.

In the drawings

FIG. 4 is an enlarged detailed side view of the gripping means of the apparatus;

FIG. 5 is an enlarged detailed front elevation view of the wedge-shaped member of the apparatus;

FIG. 6 is an enlarged detailed side elevation view of the wedge-shaped member of the apparatus; and FIG. 7 is an enlarged detailed side section view of the sealing means of the apparatus.

Figure 3:
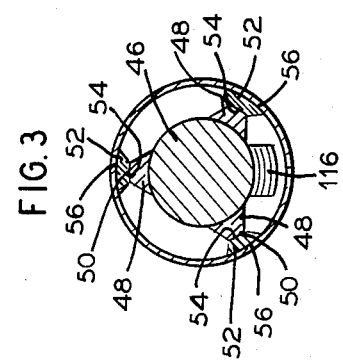
FIG. 3 is a sectional view thereof taken along lines 3—3 of FIG. 2.
Figure 1:
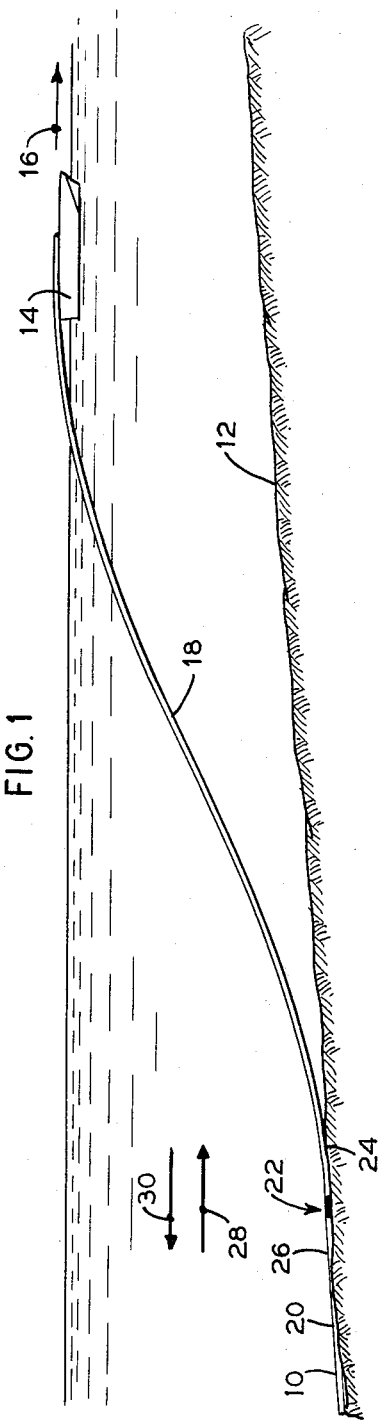
FIG. 1 is a schematic view of a pipeline being laid from a work barge with an underwater pipeline sealing apparatus in position at sea bottom.

FIG. 1 illustrates a pipeline 10 being laid on a sea bottom 12 from a work barge 14 as the work barge moves in the direction illustrated at 16 in which the pipeline is being laid. As illustrated, the pipeline 10 forms a catenary portion illustrated at 18 between the work barge 14 and sea bottom 12 which portion is susceptible to buckling and breakage, particularly during rough seas. If breakage were to occur without the pipeline 10 being otherwise adequately protected as provided herein, the previously laid section 20 of pipeline on the sea bottom 12 will become flooded with water as previously indicated.

Figure 2:
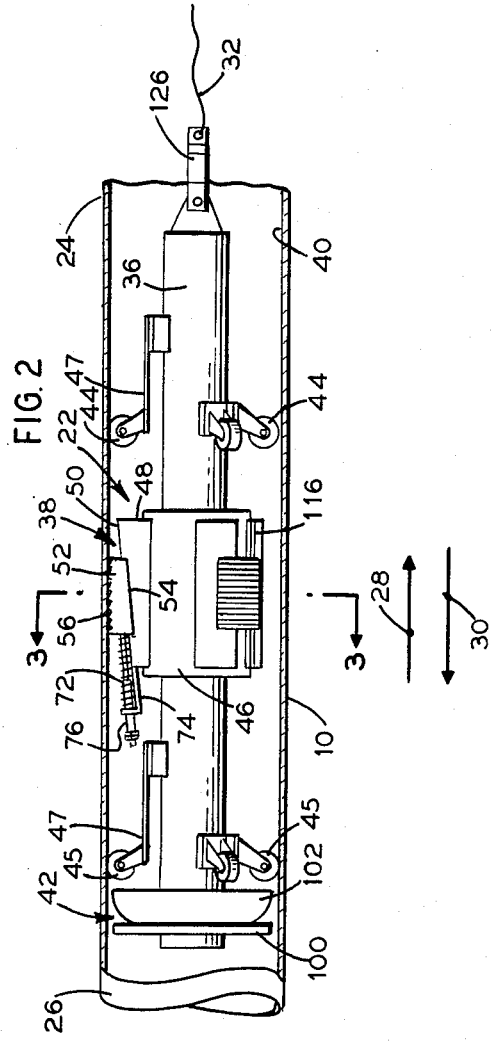
FIG. 2 is a side elevational view of an apparatus embodying this invention and disposed in a pipeline.

Referring to FIG. 1 along with FIG. 2, there is provided for the purposes of preventing such an influx of water into the pipeline section 20 an apparatus generally indicated at 22 for preventing flow of water from a first underwater pipeline portion 24 forward of the apparatus to a second underwater pipeline portion 26 rearward of the apparatus. Thus, a purpose of the apparatus 22 is to seal a pipeline 10 against the flow of water into a dry pipeline portion (second underwater pipeline portion 26) if there is a breakage in the area of the catenary portion 18 (first underwater pipeline portion 24) while the pipeline 10 is being laid on the sea bottom 12.

A tow line 32 may be provided for attachment to a forward portion of the apparatus 22 for towing of the apparatus in a forwardly direction 28 through the pipeline 10 as it is being laid so that it may be continually disposed in a section of the pipeline which is rearward of and adjacent the catenary portion 18 as the pipeline is laid. For the purposes of this specification and the claims, a "forwardly direction" of an apparatus, illustrated at 28, is defined as a direction along the apparatus opposite to the direction of water flow against which the apparatus is constructed to seal when the apparatus is disposed in a pipeline, and a "rearwardly direction" of an apparatus, illustrated at 30, is defined as a direction along the apparatus which is the same direction as the direction of water flow against which the apparatus is constructed to seal when the apparatus is disposed in a pipeline.

The apparatus 22 is provided with a carriage 36 upon which is mounted a means, generally indicated at 38, for grippingly engaging a pipeline internal wall 40 to prevent movement of the apparatus 22 in the rearwardly direction 30. Means, generally indicated at 42, are also provided for sealing the pipeline 10 against the flow of water from a first underwater pipeline portion 24 to a second underwater pipeline portion 26.

In order to provide centering of the apparatus 22 in a pipeline 10 as well as decreased resistance to forward movement of an apparatus 22 through a pipeline 10, a set of wheels 44 mounted on forward portion of the apparatus 22 and another set of wheels 45 mounted on a rearward portion of the apparatus 22 are preferably provided. A set of wheels preferably comprises a plurality of wheels spaced to contact a pipeline internal wall at various points which are spaced apart circumferentially thereof. Means such as leaf springs 47 may be provided on one or more wheels of each set of wheels 44 and 45 to bias or urge the upper wheels against a pipeline wall. Caster wheels with rubber treads have been found to work satisfactorily although various other types of suitable wheels may be employed.

The pipeline gripping means 38 is preferably provided with at least one but preferably three or more carriage members 48 which are proportionately spaced circumferentially about a centrally disposed carriage portion 46 and each of which extends radially outwardly therefrom to a surface 50 which engages a wedge-shaped member 52 and which surface is spaced from but inclined to a pipeline wall 40 when the apparatus 22 is disposed within a pipeline 10. A wedge-shaped member 52 has a first surface 56 preferably annularly shaped to cnform to the shape of the pipeline internal wall 40 for engagement therewith, and a second surface 54 which slidably engages complementary surface 50 on carriage member 48.

Referring to FIG. 5, means such as, for example, recess 58 formed in wedge-shaped member 52 at surface 54 to define a portion for interlocking with complementarily shaped portion 60 of member 48 is preferably provided to prevent disengagement of the wedge-shaped member 52 from carriage member 48 but to allow sliding of wedge-shaped member 52 in the forward and rearward directions 28 and 30 respectively of the apparatus 22 along the surface 50 of carriage portion 46. The recess 58 has a width 62 at points furtherest from surface 56 which is less than a width 64 at corresponding points closer to surface 56 to provide portions 66 of wedge-shaped member 52 which overlap a portion 68 of carriage member 48 to provide such interlocking means.

Referring to FIGS. 2 and 6, the wedge-shaped member 52 is tapered in the forwardly direction 28 such as to have a lesser spacing between first and second surfaces 56 and 54 respectively at a forward porion thereof as illustrated at 70. The spacing increases with increasing distance along the wedge-shaped member 52 in the rearwardly direction 30 to a greater spacing, illustrated at 71, at a rearward portion thereof. For purposes of this specification and the claims, the spacing between first and second surfaces 56 and 54 respectively is measured in a direction normal to the first surface 56. Member 52 is slidably mounted on the carriage member surface 50 as aforesaid for movement in forward and rearward directions 28 and 30 respectively and into gripping engagement with a pipeline wall 40 for preventing movement of apparatus 22 in the rearwardly direction 30 upon application of force urging carriage 36 in the rearwardly direction 30 in the pipeline 10.

However, if wedge-shaped member 52 is not already in contact with a pipeline wall 40 at the time force is applied to the carriage 36 urging the carriage in the rearwardly direction 30, then the wedge-shaped member 52 may just ride the carriage 36 resulting in movement of the carriage in the rearwardly direction 30 without the wedge-shaped member 52 ever contacting the pipeline wall 40 for gripping engagement thereof. In other words, in such a case there would not be any frictional force or other resistance to movement of the wedge-shaped member rearwardly which resistance would tend to cause movement of carriage member 48 in the rearwardly direction 30 relative to wedge-shaped member 52 so that wedge-shaped member 52 could be urged outwardly into gripping engagement with a pipeline wall 40. In accordance with an aspect of this invention, there is provided means such as, for example, spring 72 for urging the wedge-shaped member 52 into sliding engagement with the pipeline internal wall 40 to provide such frictional force for use in urging wedge-shaped member 52 into gripping engagement with a pipeline internal wall 40 if the carriage 36 is urged in the rearwardly direction 30. Such a means is best shown in FIG. 4 wherein a support plate 74 is shown rigidly attached at a suitable location on the carriage such as at carriage member 48. Spring guide means such as tubular guide 76 and rod 82 extends between the support plate 74 and member 52 for positioning of the spring 72. Tubular guide 76 extends through an aperture 78 in the support plate 74 and in a forwardly direction 28 of the apparatus 22 toward the wedge-shaped member 52. A nut 80 is brazed or otherwise fastened to the tubular guide 76 at the rearward end thereof. Rod 82 is threadedly or otherwise attached at one end to the wedge-shaped member 52 at aperture 84 and extends through the tubular guide 76. Guide nut 80 is threadedly engaged to the rod 82 for jacking the wedge-shaped member 52 in a rearwardly direction 30 for positioning of the wedge-shaped member 52 away from the pipeline wall 40 when it is desirable to do so such as during insertion of the apparatus 22 into a pipeline. Another nut 86 is brazed or otherwise fastened to the rod 82 rearwardly of guide nut 80 to prevent backing off and subsequent disengagement of guide nut 80 from the rod 82. Spring 72 is mounted under compression about tubular guide 76 and rod 82 over the distance, illustrated at 88 in FIG. 4, between the wedge-shaped member 52 and the support plate 74 to urge the wedge-shaped member 52 into sliding engagement but not gripping engagement with the pipeline wall 40 continuously and reliably as the apparatus 22 is pulled in a forwardly direction 28 through a pipeline. The strength of the spring 72 may be selected in accordance with engineering principles of common knowledge to those of ordinary skill in the art to which this invention pertains.

The support plate aperture 78 is preferably provided with an oversize diameter relative to the tubular guide diameter as illustrated in FIG. 4 so that wedge-shaped member 52 may self-adjust for alignment variations whereby its first surface 56 may more effectively align against a pipeline wall 40. For example, for a tubular guide diameter of ⅝ in. (1.6 cm.), the support plate aperture diameter may be 1¼ in. (3.2 cm.).

Referring to FIGS 5 and 6, recesses 90 are preferably formed in the second surface 54 at innermost points thereof. These recesses 90 extend in the forward and rearward directions 28 and 30 respectively at both the forward and rearward ends of the second surface 54 to provide a ledge 92 centrally located between the forward and rearward ends of the wedge-shaped member 52 to effect slight tilting of the wedge-shaped member 52 as it is pulled through a pipeline for more effective alignment of the first surface 56 of the wedge-shaped member 52 with a pipeline wall 40.

The wedge-shaped member 52 is preferably comprised of steel which is case hardened by liquid carburizing to a Rockwell hardness of about 55 to 58 on the "C" scale so that it has a hardness greater than a typical pipeline wall hardness. The first surface 56 of the wedge-shaped member 52 is preferably provided with coarse teeth 94 to provide improved ride of the wedge-shaped member 52 over weld beads. For example, a tooth length to tooth height ratio of 5 to 1 is considered to be satisfactory. In order to lessen the possibility of the teeth 94 scoring a pipeline wall, the teeth points 96, which contact the pipeline wall 94, are preferably flattened to a width, as illustrated at 98 in FIG. 6, of perhaps 0.2 in. (0.5 cm.). Although a preferred means for urging the member 52 into sliding engagement with a pipeline internal wall 40 has been illustrated, the scope of this invention is not limited to such means but is meant to include other types of suitable structures for urging the wedge-shaped member 52 into sliding engagement with a pipeline internal wall such as, for example, a spring under tension attached to a forward portion of the wedge-shaped member 52.

Referring to FIGS. 2 and 7, the sealing means 42, according to a preferred embodiment of this invention, is provided with an annular, generally cup-shaped, water impervious elastomeric member 102 sealingly attached to a water imprervious partition means such as plates 100 and 110 at least one of which is in turn sealingly attached such as by the weld illustrated at 104 to a portion of the carriage 36 to provide a water impervious area bounded by the tip 112 of the elastomeric member 102. The elastomeric member 102 extends from its points of attachment to partition plates 100 and 110 in a forwardly direction 28 of the apparatus 22 as well as in a direction, illustrated at 106, toward a pipeline wall 40 and terminates a tip 112 when the apparatus 22 is disposed within a pipeline 10. This elastomeric member 102 may be composed of any suitable material such as, for example, rubber or urethane. It has a maximum diameter, illustrated at 108, in its relaxed shape which is less than the inside diameter of the pipeline. By "relaxed shape" is meant, for the purposes of this specification and the claims, the equilibrium shape which an elastomeric member attains following the removal of stress therefrom such as the removal of water pressure acting thereagainst. For a pipeline having an inside diameter of 22.8 in. (57.9 cm.), the elastomeric member 102 may have, for example, a maximum diameter in its relaxed shape of 21.75 in. (55.25 cm.). The elastomeric member 102 is responsive to water pressure from forwardly of the apparatus 22 for flexing movement to a shape having a diameter equal to at least the inside diameter of a pipeline 10 to thereby sealingly engage a pipeline wall 40.

Partition plate 100 preferably has a diameter equal to approximately the diameter 108 of the elastomeric member 102 in its relaxed shape and is disposed adjacent to and rearwardly of the elastomeric member 102 to restrict flexing movement of the elastomeric member 102 in the rearwardly direction 30 beyond its points of attachment to partition plate 100 and 110. Otherwise, water pressure may force the elastomeric member 102 to flex rearwardly so that its tip 112 engages a pipeline wall 40 and then flex further rearwardly so that its tip 112 disengages the pipeline wall 40 whereby the pipeline wall is no longer sealed against the flow of water.

To provide attachment of the elastomeric member 102 to the partition means, an inner terminal portion of elastomeric member 102 may be disposed between partition plate 100 and a radially outwardly projecting portion 114 of partition plate 110 which projecting portion is also on a forward portion of the plate 110. The terminal portion of elastomeric member 102 may be sealingly clamped therebetween by suitable clamping means such as bolts 122 and one or more shims 124. However, this invention is not meant to be limited to such means for sealingly clamping the elastomeric member to partition members. The scope of this invention is meant to encompass any suitable means for providing a water impervious area within the confines of the elastomeric member tip 112.

It is desirable that the elastomeric member 102 have sufficient rigidity to adequately withstand the pressure of water which will normally be applied against it yet have sufficient flexibility to readily and reliably flex so that its tip 112 engages a pipeline wall for sealing thereof. A suitable elastomeric member thickness can be determined by applying engineering principles of common knowledge to those of ordinary skill in the art to which this invention pertains. For a polyester urethane material and a pipeline inside diameter of 22.8 in (57.9 cm.), a thickness, illustrated at 118 in FIG. 7, of the elastomeric member 102 in the range of about ¾ to 1 in. (2 to 2.5 cm.) has been found to be satisfactory. However, in order to more adequately conform the elastomeric member 102 to longitudinal weld seams for improved pipeline sealing in accordance with a preferred embodiment of this invention, a reduced thickness tip 112 may be provided. For the elastomeric member 102 described above, a tip 112 having a thickness, illustrated at 120 in FIG. 7, of about ¼ in. (0.6 cm.) over a distance of about 1¼ in. (3 cm.) is believed to be satisfactory although a gradual change in effectiveness is expected as the tip thickness is changed within the range of about one-fourth to one-half of elastomeric member thickness 118. For the purposes of the specification and the claims, a "reduced thickness tip" of an elastomeric member is defined as a tip having a thickness which is not more than about one-half of a thickness of the remainder of the elastomeric member.

Although the sealing means 42 is preferably disposed rearwardly of the gripping means 38 as shown in FIG. 2, this invention is not meant to be limited thereto. For example, the sealing means 42 may be located forwardly of the gripping means 38.

In order to prevent torque from being tranmitted to the apparatus by towing line or cable 32 which torque may tend to cause rotation of the apparatus 22 in the pipeline 10, a suitable swivel means, illustrated at 126, is preferably provided for attaching the cable 32 or other towing line to the apparatus 22. In order to maintain the apparatus 22 in an upright position such as shown in FIG. 2 and stable against rotation during its movement through a pipeline, the apparatus 22 is preferably provided with ballast means such as one or more ballast plates 116 to counteract most forces which may tend to cause rotation of the apparatus 22 to a different position than its upright position during use. By "ballast plates" is meant, for the purposes of this specification and the claims, plates applied to an underside of an apparatus and having a weight equal to at least five percent of the overall weight of the apparatus (exclusive of the weight of the ballast plates). For example, ballast plates 116 having a total weight of 100 lbs. (45 kg.) are considered to be satisfactory for an apparatus having an overall weight exclusive of the weight of the ballast plates 116 of 1200 lbs. (545 kg.).

During normal pipe laying operations, the apparatus 22 is positioned in the section of pipeline rearwardly of and adjacent the catenary 18, and may be pulled my means of a small diameter cable 32. As the apparatus 22 is pulled through the pipeline 10, the swivel means 126 acts to prevent torque from being transmitted by the towing cable 32 to the apparatus 22 and to prevent the cable 32 from becoming twisted-up, and the weight of the ballast plates 116 maintain the apparatus 22 in an upright position and stable against rotation during its movement through the pipeline 10. Meanwhile, the wedge-shaped members 52 are continually and reliably urged by springs 72 into sliding engagement with the pipeline wall 40 to provide frictional contact for use in urging of the wedge-shaped members 52 into gripping engagement with the pipeline wall 40. In the event of a pipe buckle followed by a rupture in the catenary region 18 of the pipeline, the pressure of water entering the pipeline 10 through the rupture would act on the carriage 36 and partition means in a rearwardly direction 30 of the apparatus 22. As a result, the carriage 36 will be urged in the rearwardly direction 30 and, since the wedge-shaped members 52 are already in sliding engagement with the pipeline wall 40 and providing frictional contact therewith, the wedge-shaped members 52 will be forced into gripping engagement with the pipeline wall 40 thereby preventing further rearward movement of the apparatus 22. Meanwhile, water pressure acting in the rearwardly direction 30 on the elastomeric member 102 becomes sufficient to overcome the stiffness of the elastomeric member which then flexes or deflects until it sealingly engages the internal wall 40 of the pipeline. When this occurs, the flow of water is stopped and the full pressure head of the water is exerted on the elastomeric member 102 maintaining it tightly sealed against the internal wall 40 of the pipeline. The pipeline 10 may then be recovered in a conventional manner and repaired without the necessity of time consuming and expensive dewatering operations.

Thus, since the apparatus 22 of the present invention does not require any internal power source, sensing devices, electrical apparatus, compressed air means, or any other complex devices which are likely to fail from time to time, it is easily seen that the present invention provides an inexpensive yet more reliable apparatus for preventing flow of water from a first underwater pipeline portion forward of the apparatus to a second underwater pipeline portion rearward of the apparatus.

Certain features of this invention may sometimes be used to advantage without a corresponding use of the other feature. It is also to be understood that the invention is by no means limited to those specific embodiments which have been illustrated and described herein, and various modifications thereof may indeed be made which come within the scope of the present invention as defined by the appended claims.

What is claimed is:

1. Apparatus for preventing flow of water from a first underwater pipeline portion forward of the apparatus to a second underwater pipeline portion rearward of the apparatus, the apparatus comprising: a carriage; at least one wedge-shaped member having a first surface for conforming to and engaging a pipeline internal wall and a second surface which slidably engages a complementary surface on said carriage, the spacing between said first and second surfaces increases from a lesser spacing at a forward portion of said member to a greater spacing at a rearward portion of said member; means for urging said member into gripping engagement with a pipeline wall upon application of force to said carriage in the rearwardly direction in a pipeline, said gripping means including spring means for urging said member first surface into sliding engagement with a pipeline internal wall during movement of the apparatus through a pipeline in a forwardly direction; and means responsive to water pressure from forwardly of the apparatus for sealing the pipeline against flow of water from the first underwater pipeline portion to the second underwater pipeline portion.

2. Apparatus according to claim 1 wherein said sealing means comprises water impervious partition means including an annular elastomeric member extending in a forwardly direction of the apparatus as it extends in a direction toward the pipeline wall when the apparatus is disposed in a pipeline, said elastomeric member having a maximum diameter in its relaxed shape which is less than the inside diameter of the pipeline, and said elastomeric member is responsive to water pressure from forwardly of the apparatus for flexing movement to a shape having a diameter equal to at least the inside diameter of the pipeline to sealingly engage the pipeline wall.

3. Apparatus according to any one of claims 1 and 2 wherein said means for urging said member first surface into sliding engagement with a pipeline internal wall comprises a support plate attached to said carriage and at least a portion of which is disposed rearwardly of said member, a spring guide means one end of which slidingly engages an aperture in said support plate and the other end of which is connected to said member, and a spring under compression mounted about said spring guide means and between said support plate and said wedge-shaped member for urging said member in the forwardly direction.

4. Apparatus according to claim 3 further comprising means defining a size of said support plate aperture which is greater than necessary for insertion of said spring guide means for adjusting the position of said wedge-shaped member for alignment variations.

5. Apparatus according to any one of claims 1 and 2 further comprising means defining complementary interlocking portions of said wedge-shaped member and said carriage for preventing disengagement of said wedge-shaped member from said carriage.

6. Apparatus according to any one of claims 1 and 2 wherein the apparatus comprises at least two of said wedge-shaped member proportionately spaced circumferentially about said carriage.

7. Apparatus according to any one of claims 1 and 2 further comprising means forming recesses in said second surface at the forward and rearward ends thereof for aligning said wedge-shaped member during pulling of the apparatus through a pipeline.

8. Apparatus according to any one of claims 1 and 2 wherein said wedge-shaped member is composed of steel which is case-hardened and has a Rockwell hardness on the "C" scale of between about 55 and 58.

9. Apparatus according to any one of claims 1 and 2 wherein said first surface has means defining coarse teeth for adjusting the ride of said wedge-shaped members over weld beads, and means defining flattened points on said teeth for reducing scoring of the pipeline wall.

10. Apparatus for preventing flow of water from a first underwater pipeline portion forward of the apparatus to a second underwater pipeline portion rearward of the apparatus, the apparatus comprising a carriage, a member mounted on said carriage, means for urging said member into gripping engagement with a pipeline wall upon application of force to said carriage urging said carriage in the rearwardly direction in a pipeline, said gripping means including spring means for urging said member into sliding engagement with a pipeline wall during movement of the apparatus through a pipeline in a forwardly direction, water impervious partition means including an annular elastomeric member extending in a forwardly direction of the apparatus as it extends in a direction toward the pipeline wall when the apparatus is disposed in a pipeline, said elastomeric member having a maximum diameter in its relaxed shape which is less than the inside diameter of the pipeline, and said elastomeric member is responsive to water pressure from forwardly of the apparatus for flexing movement to a shape having a diameter equal to at least the inside diameter of the pipeline to sealingly engage the pipeline wall.

11. Apparatus according to any one of claims 2 and 10 wherein said elastomeric member has a reduced thickness tip.

12. Apparatus according to any one of claims 1, 2, and 10 further comprising ballast means attached to the underside of the apparatus for maintaining the apparatus in an upright position in a pipeline.

13. Apparatus according to claim 12 further comprising swivel means to which a towing line is attached to prevent torque from being transmitted to the apparatus by the towing line.

14. Apparatus for preventing flow of water from a first underwater pipeline portion forward of the apparatus to a second underwater pipeline portion rearward of the apparatus, the apparatus comprising a carriage, a member mounted on said carriage, means for urging said member into gripping engagement with a pipeline wall upon application of force to said carriage urging said carriage in the rearwardly direction in a pipeline, said gripping means including spring means for urging said member into sliding engagement with a pipeline wall during movement of the apparatus through a pipeline in a forwardly direction, water impervious partition means including an annular elastomeric member which extends in a forwardly direction of the apparatus as it extends in a direction toward the pipeline wall when the apparatus is disposed in a pipeline, said elastomeric member having a maximum diameter in its relaxed shape which is less than the inside diameter of the pipeline, said elastomeric member having a reduced thickness tip, and said elastomeric member is responsive to water pressure from forwardly of the apparatus for flexing movement to a shape having a diameter equal to at least the inside diameter of the pipeline to sealingly engage a pipeline wall.

15. Apparatus for preventing flow of water from a first underwater pipeline portion forward of the apparatus to a second underwater pipeline portion rearward of the apparatus, the apparatus comprising a carriage, a member mounted on said carriage, means for urging said member into gripping engagement with a pipeline wall upon application of force to said carriage urging said carriage in the rearwardly direction in a pipeline, said gripping means including spring means for urging said member into sliding engagement with a pipeline wall during movement of the apparatus through a pipeline in a forwardly direction, means responsive to water pressure from forwardly of the apparatus for sealing of the pipeline against flow of water from the first underwater pipeline portion to the second underwater pipeline portion, and ballast means attached to the underside of the apparatus for maintaining the apparatus in an upright position in a pipeline.

16. Apparatus according to claim 15 further comprising swivel means to which a towing line is attached to prevent transmission of torque to the apparatus from the towing line.

17. Apparatus according to any one of claims 1, 2, 11, 14, and 15 further comprising means including wheels for centering of the apparatus in a pipeline, and spring means connected to at least one of said wheels to bias said wheels against the pipeline internal wall.

18. Apparatus according to any one of claims 2, 10, and 14 wherein said sealing means further includes a plate disposed rearwardly of and adjacent said elastomeric member and which has a diameter equal to approximately the diameter of said elastomeric member in its relaxed shape to restrict flexing of said elastomeric member in a rearwardly direction.

* * * * *